United States Patent Office 3,721,721
Patented Mar. 20, 1973

3,721,721
METHOD OF ETHYLENE POLYMERIZATION
Kenichi Maemoto, Takatsuki, Takezo Sano, Ibaragi, and Akio Kobayashi, Toyonaka, Japan, assignors to Sumitomo Chemical Company, Limited, Osaka, Japan
No Drawing. Filed Apr. 15, 1971, Ser. No. 134,440
Claims priority, application Japan, Apr. 21, 1970, 45/34,453
Int. Cl. C08f 1/56, 3/06
U.S. Cl. 260—85.3     15 Claims

ABSTRACT OF THE DISCLOSURE

An ethylene polymer having optional molecular weight distribution from narrow to broad is easily produced in good slurry state, in high solvent efficiency and in high catalyst efficiency, by polymerizing ethylene alone or together with other unsaturated hydrocarbon in the presence or absence of hydrogen, using a catalyst comprising (1) as a first component a substance prepared by a method which comprises reacting a vanadium compound with a phosphoric acid and/or its derivative, treating the reaction product with an alcohol, separating from the alcohol-treated product an alcohol soluble product in the form of a solid and adding 1 to 20% by weight of water to said solid alcohol soluble product and (2) as a second component a substance composed mainly of an organo-aluminum compound having the formula, $$R_nAlX_{3-n}$$

wherein R is a hydrocarbon group having 1 to 8 carbon atoms; X is a halogen atom, an alkoxy group or a hydrogen atom; and $n$ is a positive number of 3 or less.

---

This invention relates to an improved process for homopolymerizing ethylene or copolymerizing ethylene with other polymerizable unsaturated hydrocarbon, and particularly to the improvement of a catalyst for use in said process.

The present inventors already proposed as an excellent ethylene polymerization catalyst in British Pat. 1,130,696 a binary catalyst system comprising (1) as the first component a novel substance obtained by reacting a vanadium compound with a phosphoric acid and/or its derivative and then treating the resulting product with an alcohol, and (2) as the second component a substance composed mainly of an organoaluminum compound having the formula, $$R_nAlX_{3-n}$$

wherein R is a hydrocarbon group having 1 to 8 carbon atoms; X is a halogen atom, an alkoxy group or a hydrogen atom; and $n$ is a positive number of 3 or less.

For the further improvement of the ethylene polymerization processes from the industrial standpoint, the inventors progressed researches, and have found that it is possible to produce polymer in easily processable state by improving the first component of the aforesaid catalyst. Based on the said finding, the inventors have accomplished the present process.

A first object of the present invention is to improve the formation state of ethylene polymer. In a low pressure ethylene polymerization process, a polymerization temperature of below 100° C. is generally employed. At below 100° C., the resulting polymer deposits and suspends in the solvent to form a slurry. In this type of polymerization, the higher polymer yield per unit volume of solvent (solvent efficiency) and the easier removal of polymerization heat from the slurry are desired. Further, in the steps subsequent to the polymerization reaction, i.e. in the step of transporting the slurry and the step of separating the formed polymer from the solvent, it is also desired that the state of the formed polymer is such that the heat transfer can be easily effected. The catalyst systems, which were already proposed in British Pat. 1,130,696 by the inventors, were sufficiently high in catalyst activity but were not always satisfactory in formation state of polymers. The state of polymer produced mainly depends on the properties of the first component. The first component in British Pat. 1,130,696 frequently produces too fine polymer particles, powder of lower bulk density or pasty slurry, and accordingly high solvent efficiency could not always be attained. Thus, the first object of the invention is to overcome these drawbacks.

A second object of the present invention is to control the molecular weight distribution of the resulting polymer. It is well known that the molecular weight distribution of a polymer is closely related to the melt rheology of the polymer. According to the type of molding process and the kind of molding machine, resins having various melt rheological properties suitable therefor and required, and recently the requirement for the better melt flow properties of resins becomes greater with progress of the molding process. Great factors, which affect the melt rheology of a high density polyethylene are the molecular weight and the molecular weight distribution. Further, it is well known that the molecular weight distribution of a polymer has great influence on the mechanical strength and appearance of a molded article obtained therefrom. Accordingly, the optimum molecular weight distribution of a polymer is decided from collective judgement of the processability of the polymer and the mechanical strength and appearance of a molded article obtained therefrom. Concretely, it is said that a polymer having narrow in molecular weight distribution is suitable for injection molding, while a polymer having broad in molecular weight distribution is suitable for blow molding. In the polymerization of ethylene, therefore, the control of molecular weight distribution of the resulting polymer is essential.

The above-mentioned objects can be accomplished according to the process of present invention for producing an ethylene polymer which comprises contacting ethylene with a binary catalyst system comprising an improved first component and an organoaluminum compound, said first component being prepared by a method comprised reacting a vanadium compound with a phosphoric acid and/or its derivative, treating the reaction product with an alcohol, separating the resulting alcohol soluble portion in the form of solid and then absorbing 1 to 20% by weight of water to the said separated alcohol soluble portion.

Although there are no formal index to express the state of polymer particle and the state of polymer slurry, the present inventors have found that the indexes shown below are effective therefor and adopted the said indexes.

| Index | Evaluation |
|---|---|
| 1. Time required for cooling of slurry [1]. | The shorter the time, the higher the evaluation. |
| 2. Amount of fine particles of less than 5μ in diameter in the formed polymer. | The larger the amount, the lower the evaluation. |
| 3. Coarse grains of more than 5 mm diameter in the formed polymer. | The evaluation is low if there are any such coarse grains. |
| 4. Specific sedimentation volume [2]. | The volume is desirably less than 6. |
| 5. Ratio of solvent remained to filtration cake (percent).[3] | The smaller the ratio, the higher the evaluation. |

[1] About 0.5 liter of a slurry is charged in a cylindrical vessel of 5 mm. in thickness and 100 mm. in diameter and externally cooled with running water at about 20° C., and the time required for cooling the slurry from 60° C. to 35° C. is measured by means of a thermometer inserted in the vessel.
[2] The apparent specific volume of the formed polymer sedimented in the slurry; cc./g.
[3] Ratio (percent) of the amount of solvent by weight remained in a filtration cake formed after suction filtration for about 10 minutes under a reduced pressure of less than 50 mm. Hg to the amount of dried polymer by weight.

The molecular weight distribution of a polymer is determined by fractionating the polymer according to column fractionation method and measuring the molecular weight of each fractionated polymer. It is advantageous to carry out the measurement according to gel permeation chromatography (GPC), which has been developed recently. The present inventors used Model 200 Gel Permeation Chromatograph, manufactured by Waters Associates Inc. and measured the molecular weight distribution at 135° C. by use of o-dichlorobenzene as a solvent, using columns of $10^3$, $10^4$, $10^5$ and $10^6$ A. The width of molecular weight distribution was represented by $Q = \overline{M}_w/\overline{M}_N$, wherein $\overline{M}_w$ and $\overline{N}_N$ are weight average molecular weight and number average molecular weight, respectively, measured according to an ordinary procedure by GPC.

The process of the present invention is explained in further detail below.

The present process is characterized in that ethylene is contacted either alone or together with other unsaturated hydrocarbon in the presence or absence of hydrogen with a catalyst comprising (1) as a first component a substance obtained by a method which comprises reacting a vanadium compound with a phosphoric acid and/or its derivative, treating the reaction product with an alcohol, separating from the alcohol-treated product an alcohol soluble portion in the solid state and then adding 1 to 20% by weight of water to said solid alcohol soluble portion, and (2) as a second component a substance composed mainly of an organoaluminum compound having the formula, $$R_nAlX_{3-n}$$

wherein R is a hydrocarbon group having 1 to 8 carbon atoms; X is a halogen atom, an alkoxy group or a hydrogen atom; and $n$ is a positive number of 3 or less.

The intermediary material used for preparing the first component of the catalyst (hereinafter abbreviated to "intermediary material") is a product obtained by the reaction of a vanadium compound with a phosphoric acid and/or its derivative. It is inferred that this product has such a structure that vanadic acid and phosphoric acid have been condensed each other by dehydration, but accurate chemical structure and solid structure thereof have not been clarified yet. In most cases, the ratio of V to P in the product is close to 1:1 by atomic ratio, but products having various $V:P$ ratio are obtained depending on preparation conditions, and these may also be used as intermediary materials.

Examples of the vanadium compound, which is one component of the primary starting material for synthesis of the intermediary material, include oxides, halides, oxyhalides, sulfates and oxysulfates of vanadium; sodium, ammonium and the like salts of vanadic acid; and esters of vanadic acid with alcohols. Examples of the phosphoric acid or its derivative, which is the other component of the primary starting material, include various phosphoric acids such as orthophosphoric acid, pyrophosphoric acid, metaphosphoric acid, polyphosphoric acid, phosphoric anhydride and mixtures thereof; salts of said acids and esters of said acids with alcohols.

The reaction for synthesis of the intermediary material is carried out in the presence or absence of reaction medium. In most cases, it is effected in the presence of a small or large amount of water and/or alcohol. In this case, the reaction is desirably carried out while controlling the concentration of the primary starting material, the hydrogen ion concentration, the ratio of the two components, the reaction temperature and the reaction time. In some cases, the above reaction may be effected in the absence of water or alcohol. For example, the reaction of vanadium oxide with phosphoric acid and/or phosphoric anhydride, or the reaction of ammonium vanadate with ammonium phosphate may also be effected. In such cases, the reaction is desirably carried out at a high temperature of 100° C. or above.

The intermediary material is obtained in the solid state. The material is not particularly required to be purified, and may be used without removing less amounts of the primary starting material and reaction medium contained therein. However, it is necessary that the intermediary material contains at least a considerable amount of a V-O-P linkage.

The alcohol used to treat the intermediary material may be any of aliphatic, alicyclic, aromatic, alcohols which may not only be monohydric but also be polyhydric. Alternatively, a mixture comprising 2 or more of such alcohols may be used. Further, there are cases where an alcohol containing in the molecule other functional group than hydroxyl group is used. Typical examples of such alcohols include methyl alcohol, ethyl alcohol, n-propyl alcohol, i-propyl alcohol, n-butyl alcohol, i-butyl alcohol, sec-butyl alcohol, t-butyl alcohol, n-amyl alcohol, i-amyl alcohol, n-hexyl alcohol, n-heptyl alcohol, n-octyl alcohol, i-octyl alcohol, 2-ethylhexyl alcohol, n-nonyl alcohol, n-decyl alcohol, n-dodecyl alcohol, cetyl alcohol, ethylene glycol, 1,2-propylene glycol, 1,3-propylene glycol, 1,4-butylene glycol, 1,6-hexamethylene glycol, glycerin, ethylene glycol monomethyl ether, cyclohexyl alcohol, benzyl alcohol, phenylethyl alcohol, furfury alcohol, phenol, cresol, catechol, resorcinol, hydroquinone and pyrogallol.

The above-mentioned alcohol treatment may be effected either in the absence or presence of a solvent, which includes hydrocarbons, halogenated hydrocarbons, ethers, ketones and esters. In case the alcohol treatment is carried out in the presence of a solvent, low boilings (including water), which are formed in the treatment, can be easily removed according to azeotropic distillation method, and the temperature can be controlled by the boiling point of the solvent used, so that the object of activation by the alcohol treatment can be easily attained in some cases. Concrete examples of the solvent used are benzene, toluene, xylene, hexane, heptane, cyclohexane, acetone, methylethylketone, ethyl acetate, dioxane, tetrahydrofuran, diethyl ether, dipropyl ether, ethylene glycol dimethyl ether, carbon tetrachloride and butyl bromide.

Conditions employed in the alcohol treatment vary depending on the kinds of intermediary material and alcohol, the presence or absence of solvent, and the kind of solvent. Ordinarily, however, the treating temperature is from normal temperature to a temperature up to 250° C., preferably from 50° to 200° C., and the treating time is from 10 minutes to 100 hours, preferably from 30 minutes to 20 hours. The treatment at a high temperature above 250° C. and a long treating time more than 100 hours sometimes brings about the secondary denaturation of catalyst components. The amount of alcohol used is 0.1 to 1,000 parts by weight, preferably 1 to 100 parts by weight, per part by weight of the intermediary material.

After the alcohol treatment, an insoluble portion is separated from the product, and an alcohol soluble product is recovered from the remaining alcohol solution product. The separation of the insoluble portion is carried out by filtration or centrifugal separation. The recovery of the alcohol soluble product from the alcohol solution portion is carried out by removing volatiles from alcohol solution by evaporation. In case the solution portion is dried after incorporation of a carrier such as metal oxide, the alcohol soluble product supported on carrier can easily be obtained. In the above manner, the alcohol soluble product is recovered ordinarily in a solid state. The amount of the aforesaid alcohol insoluble portion varies depending on the conditions of alcohol treatment. This portion also has a catalyst activity and hence is not particularly required to be separated if the amount thereof is small.

It has been found, as the result of elementary analysis, that the thus obtained alcohol soluble portion is a substance composed of vanadium, phosphorus, carbon, hydrogen and oxygen. It is a great characteristic of the present process that depending on the conditions of alcohol treatment, the alcohol soluble product varies in composition and thus in catalytic performance to become high in diversity in practical uses. The alcohol soluble portion is a substance which cannot be represented by a stoichiometrically definite chemical formula.

It is inferred that the alcohol soluble product is not a single compound, but is a substance composed of compounds having a wide variety in molecular weight, in amount of combined alcohol and in average valency of vanadium.

During the alcohol treatment, there is ordinarily observed such a phenomenon that water is released. The amount of the released water is larger than that of water which has been contained in the intermediary material, so that it is inferred that water is formed by the reaction of alcohol with the intermediary material. The control of water content is an important factor for the increase in yield of the alcohol soluble product. In addition, a more or less amount of an oxidation product of alcohol is by-produced. From this, it is inferred that the reduction of vanadium has also occurred during the alcohol treatment.

The above-mentioned procedure in alcohol treatment has been disclosed in British Pat. No. 1,130,696. New following additional procedures is necessary in this invention.

To the alcohol soluble product, which has thus been recovered in the solid state, water is added to obtain a first catalyst component. The addition of water is carried out in the manner that the alcohol soluble product is placed in a closed system kept under reduced pressure, and a vessel containing a given amount of water is connected to the system, or in the manner that gas containing a controlled amount of water is introduced into the alcohol soluble product. As the said gas, there may be used nitrogen, hydrogen or ethylene. In this case, it is preferable that the alcohol soluble portion is mechanically tumbled or is maintained in a fluidized state by means of the introduced gas, so that the addition of water may be effected uniformly. The amount of water added is 1 to 20% by weight, preferably 3 to 10% by weight, based on the weight of the alcohol soluble product. If the amount of water is less than 1% by weight, the effect of addition of water is less, while if the amount of water is more than 20% by weight, an excessively long period of time is required for the addition of water and, at the same time, the resulting product tends to be undesirably deteriorated during storage. The temperature at which the addition of water is effected is desirably 50° C. or less. At a temperature higher than 50° C., the alcohol soluble portion is liable to be denatured. During the addition of water, a more or less amount of heat is generated, so that it is preferable to control the temperature. The thus obtained first catalyst component is stored in a cold place in an inert gas atmosphere so as to be usable any time.

The first catalyst component may be used as it is in the above-mentioned state, i.e. in a water-absorbed state. Alternatively, it may be subjected to necessary pre-treatment prior to use. That is, the thus produced first component is subjected, prior to use, to heat treatment at about 50° C., whereby the state of contact of water with the alcohol soluble product can be varied.

As the second catalyst component, there may be used an organoaluminum compound having at least one carbon-aluminum bond, or a mixture of said organoaluminum compound with a halogenated aluminum compound. The second catalyst component is represented by the formula, $$R_nAlX_{3-n}$$

wherein R is an aliphatic or aromatic hydrocarbon group having 1 to 8 carbon atoms; X is a halogen atom, an alkoxy group or a hydrogen atom; an $n$ is a positive number of 3 or less.

As such organoaluminum compounds, there are used trialkylaluminums, triarylaluminums, dialkylaluminum halides, dialkylaluminum hydrides, dialkylaluminum alkoxides, diarylaluminum halides, alkylaluminum sesquihalides, alkylaluminum dihalides or arylaluminum dihalides. Typical examples of the organoaluminum compounds include trimethylaluminum, triethylaluminum, triisobutylaluminum, trihexylaluminum, trioctylaluminum, diethylaluminum chloride, diisobutylaluminum chloride, diisobutylaluminum bromide, diethylaluminum iodide, diphenylaluminum chloride, ethylaluminum sesquichloride, ethylaluminum dichloride, isobutylaluminum dichloride, diethylaluminum hydride, diisobutylaluminum hydride and diethylaluminum ethoxide.

The above-mentioned organoaluminum compound may be used in a pure form as the second catalyst component. Alternatively, starting materials for the preparation of said organoaluminum compound may be added to the reaction system so that the second catalyst component is formed in the system.

As the second catalyst component, there may also be used a mixture of an organoaluminum compound and an aluminum halide, e.g. a mixture of a trialkylaluminum and an aluminum halide. Of course, mixtures of various halogenated organoaluminum compounds and aluminum halides or trialkylaluminums may also be used. As the aluminum halides, there are used aluminum fluoride, aluminum chloride, aluminum bromide and aluminum iodide.

The polymerization reaction may be effected in the absence of solvent, but is preferably effected in the presence of a solvent. As the solvents, aliphatic and alicyclic hydrocarbons are used, and propane, butane, pentane, hexane, heptane, octane, cyclohexane, methylcyclohexane and Decalin, for example, are frequently used. These solvents may be used not only singly but also in the form of mixtures of 2 or more. For example, petroleum ether, light oil, kerosene, naphtha and the like petroleum fractions may also be used. It is desirable that the amounts of polar impurities in these solvents which tend to deactivate the catalyst have previously been decreased by means of a suitable physical or chemical procedure to less than permissible amounts.

The amounts of the individual catalyst components are selected according to the amount of the solvent used, the reaction temperature and the reaction pressure. Ordinarily, however, the amount of the first catalyst component is 0.001 to 10 parts by weight, and the amount of the second catalyst component is about 0.01 to 100 parts by weight, per 1,000 parts by weight of the solvent.

The polymerization reaction conditions are selected in consideration of the concentration of the catalyst, the shape and size of the reactor and the type of the reaction. Ordinarily, the reaction temperature is in the range of 0° to 100° C. The ethylene partial pressure is in the range of 0.1 to 200 kg./cm.², preferably 1 to 100 kg./cm.³. An inert gas may be present in the polymerization reaction. At 0° to 100° C., the polymerization product deposits with progress of the reaction to form a slurry. The polymerization reaction may be carried out either in a batchwise manner or in a continuous manner.

According to the present process, not only the homopolymerization of ethylene but also the copolymerization of ethylene with alkenes having 3 or more carbon atoms, particularly 1-alkenes and alkadienes, are easily effected. For example, ethylene can be copolymerized with propylene, butene-1, butene-2, 3-methylbutene-1, pentene-1, 4-methylbutene-1, hexene-1, octene-1 and hexadecene-1. When ethylene is copolymerized with minor proportions of such alkenes as mentioned above, it is possible to produce various resinous polyolefins which are excellent in processability and different in physical properties. In this case, definite amounts of the alkenes may be fed to the polymerization system together with ethylene. Further, ethylene can be copolymerized with a small amount of a linear or cyclic diolefin to obtain a resinous copolymer capable of cross-linking on processing. For example, ethylene can be copolymerized with butadiene, piperylene, isoprene, 1,4-hexadiene, cyclooctadiene, dicyclopentadiene and vinyl cyclohexene. Furthermore, ethylene can be copolymerized with styrene and styrene derivatives.

The polymerization reaction is terminated after a required amount of polymer has been obtained. The termination of polymerization reaction is effected either by adding a reagent capable of deactivating the catalyst or by excluding unreacted monomers. The thus obtained polymer slurry contains the catalyst or catalyst residue and the solvent. However, the catalyst efficiency in the present process is extremely high, so that the catalyst residue contained in the resulting polymer is very small in amount and is not required to be removed, in most cases. If further purification is desired, however, the catalyst residue can, of course, be removed by a conventional means.

According to the present process, it is possible to obtain ethylene homopolymers and copolymers having markedly high molecular weights which have been produced with relative difficulty on commercial scale according to the conventional processes. For example, ethylene homopolymers and copolymers having average molecular weights of 500,000 to 5,000,000 or more can be easily produced in high yields.

In practice, polyethylenes having various molecular weights are required to be optionally produced with ease. The control of molecular weights can be effected by varying the polymerization conditions or by using a suitable chain transfer agent. It has been found that when the polymerization is carried out in the presence of hydrogen, a polymer having optional average molecular weight or melt index can be easily obtained by varying the amount of hydrogen. Polyethylene having an average molecular weight of 10,000 to 300,000 is thus obtained. It is suitable for injection molding, blow molding, extrusion molding or powder molding.

The ethylene homopolymers obtained according to the present process have high mechanical strength, such as high hardness, high yield stress and high tensile strength, and low brittle points and excellent impact strength, like high density polyethylenes according to the prior art processes.

The improvement of the first catalyst component is the principle object of the present invention. Advantages obtained from the said improvement are explained in further detail below.

(1) The formation of fine polymer particles of less than 5μ in diameter is substantially prevented. These fine polymer particles result in the undesirable state of whole slurry. If fine polymer particles are formed in large amounts, the slurry becomes pasty or creamy, with the result that the removal of polymerization heat from the polymerization system becomes difficult and to make difficult the operation for separating the polymer from the slurry is also difficult. Concretely, the time required for cooling of the slurry becomes longer and the amount of the solvent adhered to the separated polymer becomes larger. Further, in drying the separated polymer, lumps are liable to be formed by agglomeration of the polymer. According to the present process, the amount of this kind of polymer particles can be decreased to substantially nil. The reason why such undesirable polymer particles are formed has not been clarified yet, but it is inferred that the active catalyst component is divided into extremely fine particles or solubilized into the polymerization solvent. It is considered that this kind of phenomenon is inhibited by absorption of water.

(2) The specific sedimentation volume of the formed polymer becomes small (e.g., 6 to 2.5 cc./g.), with the result that the solvent efficiency can be made higher. For example, even if the amount of the polymer is 400 g. per liter of the solvent, the polymer particles are in a free suspended state, and the slurry can be effectively stirred to make constant operation possible.

(3) The apparent maximum particle diameter of the polymer becomes smaller. Coarse grains of more than 5 mm. in diameter being about clogging of pipe or disorder of pump, at the time of transportation of the slurry. According to the present invention, the amount of coarse grains can be greatly decreased.

(4) The molecular weight distribution of the polymer can be controlled. In adding water to the alcohol soluble product taken out in the form of solid, the amount of water and the condition of water addition are varied, whereby the molecular weight distribution of the polymer can be varied. The molecular weight distribution becomes broader with increasing amount of water. Further, if the first catalyst component is subjected to sufficient heat treatment at above 50° C., the molecular weight distribution becomes broader. This effect varies depending on the kind of the second catalyst component. The variation in molecular weight distribution is in such a broad range as from 3 to 30 in terms of the $\bar{M}_w/\bar{M}_N$ value. Accordingly, a polymer having a desired molecular weight distribution can be produced by suitable selection of condition of the first catalyst component and the kind of the second component to be combined.

(5) A dry powder, which is obtained by separating the polymer from the slurry and then subjecting the polymer to after-treatment, is high in bulk density, so that the polymer can be easily handled in the form of powder.

It is evident that the above-mentioned advantages (1), (2), (3) and (5) are extremely important from the industrial and economical standpoints. The advantage (4) is a great advantage concerned with the processability and the practical quality of the product.

In addition, the polyethylenes obtained according to the present process have many excellent characteristics as high density polyethylenes, like those disclosed in British Pat. No. 1,130,696 which have already been proposed by the present inventors.

It is deemed that the number of methyl groups represents the number of branches. According to the present process, a polymer having less than one methyl group per 1,000 carbon atoms can be easily obtained. This value can be controlled to a certain extent by varying the reaction conditions and procedures. It goes without saying that in case of copolymerization the number can be also controlled in the conventional manner. Ethylene polymers having substantially no branches have a density of 0.960 to 0.970, which is extremely high as compared with the known ethylene polymers. Some polymer having a density of 0.940 to 0.950 can be easily obtained by aforesaid copolymerization.

The present process is illustrated in further detail below with reference to examples, but the examples are for better understanding of the intention and content of the invention and not for limitation in scope of the invention.

EXAMPLES 1–4

(1) Synthesis of intermediary material

A mixture comprising 80 g. of vanadium pentoxide and 4 liters of a 25% aqueous orthophosphoric acid solution was charged in a flask and then heated. After the vanadium pentoxide had been dissolved, the resulting solution was cooled to deposit a yellow crystalline precipitate. The precipitate was recovered by filtration, washed with water, and then dried in air at 40° C. until a constant weight was attained, whereby 119 g. of a yellow solid was obtained. This solid was used as an intermediary material hereinafter.

(2) Alcohol treatment and taking-out of alcohol soluble product

A mixture comprising 19.8 g. of the intermediary material, 545 ml. of n-amyl alcohol and 60 ml. of benzene was fed to a three-necked flask equipped with a stirrer, a thermometer and a reflux condenser. Between the flask and the reflux condenser, a cylindrical separating flask of about 10 cc. in inner volume was provided so that the reflux liquid was accumulated therein. To the lower part of the separating flask, a glass stopper was attached to make withdrawal of the liquid possible. The flask was heated in an oil bath to reflux, whereby by-produced water was azeotropically distilled off together with the benzene, and 2 layers were formed in the separating means. The treatment was continued for 10 hours while withdrawing the lower layer (water layer). Thereafter, the content of the flask was filtered, and the filtrate was gradually concentrated under reduced pressure. The concentrated liquid was transferred to a rotary evaporator and vaporized to dryness under reduced pressure over a water bath at 90° C. to obtain 30.3 g. of a brown solid as the alcohol soluble product. The elementary analysis values by weight of the alcohol soluble product thus obtained were V: 16.84%, P: 10.18%, C: 33.90%, H: 4.16%, and the balance presumably oxygen.

(3) Addition of water to alcohol soluble product

The alcohol soluble product, which had been taken out in a solid state as mentioned above, was ground in a mortar in a dry nitrogen atmosphere. Subsequently, 0.3 g. of the ground solid was placed on a glass filter of 10 mm. in diameter, and a nitrogen gas saturated with water was introduced into the glass filter at room temperature for 1 hour. The relation between the nitrogen gas introduction rate and the amount of water in the resulting first catalyst component (determined according to Karl-Fischer's method) was as set forth in Table 1.

TABLE 1

| Nitrogen gas introduction rate (1/min.) | *Amount of water absorbed (percent) |
|---|---|
| 0.5 | 3.19 |
| 1 | 5.80 |
| 2 | 6.96 |
| 5 | 8.77 |

*Amount of water absorbed (%)
$$= \frac{\text{Amount of water (g.)}}{\text{Amount of the alcohol soluble product (g.)}} \times 100$$

temperature of 60° C. while supplying ethylene to maintain the constant pressure of 21 kg./cm.² gauge. After 3 hours, unreacted gas was excluded, and then the autoclave was allowed to stand in running water at 20° C. to measure the time required to lower the inner temperature from 60° C. to 35° C. Subsequently, the content of the autoclave was taken out in a 1,000 cc. measuring cylinder and was kept quiet to settle polymer particles completely, and then the sedimentation volume of the polymer layer was measured. Thereafter, the solid polymer was subjected to suction filtration for about 10 minutes under a reduced pressure of less than 50 mm. Hg by use of a suction funnel of 110 mm. in diameter, and then the filtration cake was taken out and weighed. The filtration cake was further dried at 50° C. under reduced pressure for 10 hours and then weighed to decide the polymer yield. From the thus measured values, the following values were calculated.

Specific sedimentation volume (cc./g.)
$$= \frac{\text{Sedimentation volume of polymer particles (cc.)}}{\text{Amount of polymer produced (g.)}}$$

Ratio of solvent adhered to filtration cake (%)
$$= \left( \frac{\text{Weight of filtration cake (g.)}}{\text{Amount of polymer produced (g.)}} - 1 \right) \times 100$$

As a measure for the molecular weight of the polymer, the intrinsic viscosity $[\eta]$ (dl./g.) was measured in xylene at 120° C. by use of an Ostwald's viscometer. Further, the molecular weight distribution of the polymer was measured according to gel permeation chromatography, and the weight average molecular weight ($\overline{M}_w$) and the number average molecular weight ($\overline{M}_N$) were calculated using as a standard a monodisperse polystyrene having a known molecular weight. From these figures, the ratio of $\overline{M}_w/\overline{M}_N$ was calculated, and used as a measure for the molecular weight distribution.

The results obtained were as set forth in Table 2, in which are also shown as a control the results obtained by the first component prepared in the same manner as above, except that water was not added in the alcohol soluble product.

TABLE 2

| Example number | Amount of water added (wt. percent) | Time required for cooling of slurry (min.) | Fine particles (less than 5µ in diameter) | Coarse grains (more than 5 mm. in diameter) | Specific sedimentation volume (cc./g.) | Ratio of solvent adhered to filtration cake (percent) | Amount of polymer produced (g.) | $[\eta]$ (dl./g.) | $\overline{M}_w/\overline{M}_N$ |
|---|---|---|---|---|---|---|---|---|---|
| Control | 0 | 29 | Observed in large amount | Observed | 8.8 | 74.1 | 52.3 | 1.31 | 4.0 |
| 1 | 3.19 | 17 | None | None | 4.6 | 51.2 | 70.1 | 1.30 | 4.8 |
| 2 | 5.80 | 16 | do | do | 4.2 | 45.1 | 76.7 | 1.23 | 5.2 |
| 3 | 6.96 | 15 | do | do | 5.3 | 50.6 | 103.6 | 1.25 | 6.5 |
| 4 | 8.77 | 12 | do | do | 5.6 | 58.8 | 37.3 | 1.43 | 8.2 |

The thus obtained product was used as the first catalyst component.

(4) Polymerization of ethylene

To a 1,000 cc. stainless steel, electromagnetic stirring type autoclave (thickness: 5 mm., diameter: 100 mm.), which had previously been flushed with dry nitrogen, was fed in a nitrogen atmosphere a mixture comprising 0.02 g. of the above-mentioned first catalyst component, 0.31 g. of ethylaluminum sesquichloride as a second catalyst component and 500 ml. of n-heptane as a solvent. The autoclave was heated by use of an oil bath and, when the inner temperature had reached 60° C., hydrogen and ethylene were introduced to pressures of 8 kg./cm.² and 13 kg./cm.², respectively (total pressure: 21 kg./cm.² gauge). The polymerization was effected at the constant

EXAMPLE 5

A mixture comprising 10 g. of an intermediary material obtained in the same manner as in Examples 1 to 4 and 188 g. of n-butyl alcohol was fed to a 500 cc. three-necked flask equipped with a stirrer, a downward condenser and a dropping funnel. The flask was quickly heated by means of an oil bath at 140° C., and the mixture was subjected to alcohol treatment for 18 hours with distillation. Fresh n-butyl alcohol was supplied through the dropping funnel to maintain the amount of the liquid in the flask constant. After cooling, the liquid was filtered to separate an insoluble portion, and the filtrate was dried under reduced pressure to obtain 13.02 g. of a brown solid. This solid was pulverized in a mortar in a nitrogen atmosphere.

6.0 grams of the thus obtained alcohol soluble product was charged in a nitrogen atmosphere into a 500 cc. egg-plant type flask, which was then connected to a rotary means capable of rotating around the center line of the flask. Subsequently, a vacuum pump was connected to the rotary means to reduce the pressure inside the system to less than 0.5 mm. Hg and then the cock was closed to disconnect the vacuum pump from the rotary means. To the system, which had been reduced in pressure, was connected a stopcocked vessel of about 1 cc. in volume into which had been charged 0.42 ml. of water, and then the stopcock was opened while rotating the flask to introduce the water into the system. The water introduced into the system was quickly vaporized and adsorbed on the alcohol soluble product. In this case, the heat of adsorption was generated so that the flask was cooled with ice. After 30 minutes, the rotation of the flask was discontinued, and the pressure of the system was brought back to normal pressure by introduction of nitrogen. The weight of the resulting product increased to 6.4 g. The amount of water adsorbed on the alcohol soluble product was 6.3% as measured according to Karl-Fischer's method.

Using 0.01 g. of the thus prepared material as a first catalyst component together with 0.30 g. of diethylaluminum chloride as a second catalyst component and 500 ml. of n-heptane as a solvent, ethylene was polymerized at 60° C. for 3 hours under a hydrogen partial pressure of 4 kg./cm.$^2$ and an ethylene partial pressure of 17 kg./cm.$^2$. The polymerization procedures were the same as in Examples 1 to 4. The results obtained were as set forth in Table 3, in which are also shown as a control the results obtained by the first component prepared in the same manner as above, except that water was not added in the alcohol soluble product.

EXAMPLES 6–8

To the same rotary means equipped flask (inner volume: 500 cc.) as in Example 5 was connected to a water reservoir vessel (inner volume: 25 cc.) and the outlet of a small air-blower was further connected to said water reservoir vessel. The inlet of the small air-blower and the said flask were connected each other to form a closed system. Into the flask, which had been flushed with nitrogen, 7.2 g. of an alcohol soluble product prepared in the same manner as in Examples 1 to 4 was charged. Further, 0.5 ml. of water was charged into the water reservoir vessel. Subsequently, the air-blower was put in motion to recycle the nitrogen gas in the system, thereby adding the water to the alcohol soluble product. In this case, the rotary means was operated to carry out the absorption of water as uniformly as possible. The flask was cooled with water. When the water had been consumed, the operations of the air-blower and the rotary means were stopped, and the content of the flask was taken out to obtain 7.6 g. of a first catalyst component. The amount of water absorbed was 6.5% as measured according to Karl-Fischer's method.

The thus obtained first catalyst component was heat treated in a closed system under given conditions. Using 0.02 g. of the heat treated catalyst component, the same polymerization as in Examples 1 to 4 was effected. The heat treatment conditions and the results obtained were as set forth in Table 4, in which Example 6 shows the case where the heat treatment was not effected.

TABLE 4

| Example number | Heat treatment conditions | Time required for cooling of slurry (min.) | Specific sedimentation volume (cc./g.) | Ratio of solvent adhered to filtration cake (percent) | Amount of polymer produced (g.) | $[\eta]$ (dl./g.) | $\overline{M}_w/\overline{M}_N$ |
|---|---|---|---|---|---|---|---|
| 6 | Not treated | 15 | 4.0 | 39.7 | 83.3 | 1.31 | 4.7 |
| 7 | 80° C., 0.5 hr | 17 | 5.7 | 58.2 | 57.7 | 1.55 | 7.1 |
| 8 | 90° C., 1 hr | 14 | 5.9 | 60.7 | 37.8 | 1.75 | 12.9 |

EXAMPLES 9–10

Using 0.01 g. of the same first catalyst component as in Example 5, ethylene was copolymerized with each of propylene and n-butene-1 in the same manner as in Examples 1 to 4 under such conditions as shown in Table 5.

TABLE 5

| | Example 9 | Example 10 |
|---|---|---|
| Second catalyst component | Ethylaluminum sesquichloride, 0.31 g. | Diethylaluminum chloride, 0.30 g. |
| Comonomer | Propylene, 6 g. | n-Butene-1, 10 g. |
| Hydrogen, partial pressure | 4 kg./cm.$^2$ | 6 kg./cm.$^2$ |
| Ethylene, partial pressure | 17 kg./cm.$^2$ | 25.5 kg./cm.$^2$ |
| Solvent | n-Heptane, 500 ml. | n-Hexane, 500 ml. |

TABLE 3

| Example number | Amount of water added (wt. percent) | Time required for cooling of slurry (min.) | Fine particles (less than 5µ in diameter) | Coarse grains (more than 5 mm. in diameter) | Specific sedimentation volume (cc./g.) | Ratio of solvent adhered to filtration cake (percent) | Amount of polymer produced (g.) | $[\eta]$ (dl./g.) | $\overline{M}_w/\overline{M}_N$ |
|---|---|---|---|---|---|---|---|---|---|
| Control | 0 | 45 | Observed in large amount | Observed | 8.8 | 122.0 | 48.6 | 1.87 | 9.0 |
| 5 | 6.3 | 7 | None | None | 3.7 | 29.6 | 77.4 | 2.24 | 9.8 |

The resulting polymers were shaped into films by means of a hot press, and the number of $CH_3$ groups per 1,000 carbon atoms was calculated according to infrared spectrophotometry. The results obtained were as set forth in Table 6.

TABLE 6

| Example No. | Comonomer | Time required for cooling of slurry (min.) | Specific sedimentation volume (cc./g.) | Ratio of solvent adhered to filtration cake (percent) | Amount of polymer produced (g.) | $[\eta]$ (dl./g.) | $CH^3/1,000$ C |
|---|---|---|---|---|---|---|---|
| 9 | Propylene | 18 | 5.6 | 50.3 | 53.2 | 2.45 | 4.8 |
| 10 | n-Butene-1 | 12 | 3.9 | 37.4 | 75.5 | 1.44 | 2.4 |

What is claimed is:
1. An improved process for polymerizing ethylene comprising:
contacting ethylene either alone or together with other unsaturated hydrocarbons selected from the group consisting of an alkene having 3 to 16 carbon atoms, a diolefin having 4 to 10 carbon atoms and styrene in the presence or absence of hydrogen with a catalyst system comprising:
(1) as a first component a substance prepared by a method which comprises reacting a vanadium compound selected from the group consisting of oxides, halides, oxyhalides, sulfates and oxysulfates of vanadium; sodium and ammonium salts of vanadic acid; and esters of vanadic acid with alcohols,
with a phosphoric acid compound selected from the group consisting of orthophosphoric acid, pyrophosphoric acid, methaphosphoric acid, polyphosphoric acid, phosphoric anhydride and mixtures thereof, salts of these acids, and esters of these acids with alcohols,
treating the reaction product with an alcohol,
separating from the alcohol-treated product an alcohol soluble product in the solid state and
adding 1 to 20% by weight of water to said alcohol soluble product, and
(2) as a second component a substance composed mainly of an organoaluminum compound having the formula,

$$R_nAlX_{3-n}$$

wherein R is a hydrocarbon group having 1 to 8 carbon atoms; X is a halogen atom, an alkoxy group or a hydrogen atom; and $n$ is a positive number of 3 or less.

2. A process according to claim 1, wherein the first component is a substance prepared by a method which comprises reacting the vanadium compound with the phosphoric acid compound, treating the reaction product with an alcohol, separating from the alcohol-treated product an alcohol soluble portion in the solid state and adding 3 to 10% by weight of water into the said alcohol soluble product.

3. A process according to claim 1, wherein the alcohol for treating the reaction product is at least one member selected from the group consisting of methyl alcohol, ethyl alcohol, n-propyl alcohol, i-propyl alcohol, n-butyl alcohol, i-butyl alcohol, sec-butyl alcohol, t-butyl alcohol, n-amyl alcohol, i-amyl alcohol, n-hexyl alcohol, n-hepty alcohol, n-octyl alcohol, i-octyl alcohol, 2-ethylhexyl alcohol, n-nonyl alcohol, n-decyl alcohol, n-dodecyl alcohol, cetyl alcohol, ethylene glycol, 1,2-propylene glycol, 1,3-propylene glycol, 1,4-butylene glycol, 1,6-hexamethylene glycol, glycerin, ethylene glycol monomethyl ether, diethylene glycol monomethyl ether, cyclohexyl alcohol, benzyl alcohol, phenylethyl alcohol, furfuryl alcohol, phenol, cresol, catechol, resorcinol, hydroquinone and pyrogallol.

4. A process according to claim 1, wherein the organoaluminum compound component is at least one member selected from the group consisting of trimethylaluminum,
triethylaluminum,
triisobutylaluminum,
trihexylaluminum,
trioctylaluminum,
diethylaluminum chloride,
diisobutylaluminum chloride,
diisobutylaluminum bromide,
diethylaluminum iodide,
diphenylaluminum chloride,
ethylaluminum sesquichloride,
ethylaluminum dichloride,
isobutylaluminum dichloride,
diethylaluminum hydride,
diisobutylaluminum hydride and
diethylaluminum ethoxide.

5. A process according to claim 1, wherein the second catalyst component is a mixture of the organoaluminum compound and an aluminum halide.

6. A process according to claim 1, wherein the alkene is one member selected from the group consisting of propylene, butene-1, butene-2, 3-methylbutene-1, pentene-1, 4-methylbutene-1, hexene-1, octene-1 and hexadecene-1.

7. A process according to claim 1, wherein the polymerization is conducted in the presence of an aliphatic hydrocarbon solvent and the amount of the said first catalyst component is 0.001 to 10 parts by weight per 1,000 parts by weight of said solvent.

8. A process according to claim 1 wherein the polymerization is conducted in the presence of an aliphatic hydrocarbon solvent and the amount of the said second catalyst component is 0.001 to 10 parts by weight per 1,000 parts by weight of said solvent.

9. A process according to claim 1, wherein the said first catalyst component is subjected prior to use to heat treatment at a temperature of 50° C. to 90° C.

10. A process according to claim 1, wherein the polymerization temperature is in the range of 0° to 100° C.

11. A process according to claim 1, wherein the ethylene partial pressure is 0.1 to 200 kg./cm.$^2$.

12. A catalyst for polymerizing ethylene either alone or together with other unsaturated hydrocarbons selected from the group consisting of alkene having 3 to 16 carbon atoms, a diolefin having 4 to 10 carbon atoms and styrene which comprises:
(1) as a first component a substance prepared by a method which comprises reacting a vanadium compound selected from the group consisting of oxides, halides, oxyhalides, sulfates and oxysulfates of vanadium; sodium and ammonium salts of vanadic acid; and esters of vanadic acid with alcohols,
with a phosphoric acid compound selected from the group consisting of orthophosphoric acid, pyrophosphoric acid, metaphosphoric acid, polyphosphoric acid, phosphoric anhydride and mixtures thereof; salts of these acids; and esters of these acids with alcohols,
treating the reaction product with an alcohol,
separating from the alcohol-treated product an alcohol soluble product in the solid state and
adding 1 to 20% by weight of water to the said solid alcohol soluble product, and
(2) as a second component a substance composed mainly of an organoaluminum compound having the formula, $$R_nAlX_{3-n}$$

wherein R is a hydrocarbon group having 1 to 8 carbon atoms; X is a halogen atom, an alkoxy group or a hydrogen atom; and $n$ is a positive number of 3 or less.

13. A catalyst according to claim 12, wherein the alcohol for treating the reaction product is at least one member selected from the group consisting of methyl alcohol, ethyl alcohol, n-propyl alcohol, i-propyl alcohol, n-butyl alcohol, t-butyl alcohol, n-amyl alcohol, i-amyl alcohol, n-hexyl alcohol, n-heptyl alcohol, n-octyl alcohol, i-octyl alcohol, 2-ethylhexyl alcohol, n-nonyl alcohol, n-decyl alcohol, n-dodecyl alcohol, cetyl alcohol, ethylene glycol, 1,2-propylene glycol, 1,3-propylene glycol, 1,4-butylene glycol, 1,6-hexamethylene glycol, glycerin, ethylene glycol monomethyl ether, diethylene glycol monomethyl ether, cyclohexyl alcohol, benzyl alcohol, phenylethyl alcohol, furfuryl alcohol, phenol, cresol, catechol, resorcinol, hydroquinone and pyrogallol.

14. A catalyst according to claim 12, wherein the alcohol treatment temperature is from 50° to 250° C.

15. A catalyst according to claim 12, wherein the amount of the alcohol used to treaat the reaction product of the vanadium compound with the phosphoric acid compound is 0.1 to 1,000 parts by weight per part by weight of the said reaction product.

References Cited

UNITED STATES PATENTS 2,984,658   5/1961   Seydel et al. _____ 260—94.9 C

FOREIGN PATENTS 1,130,696   10/1968   Great Britain.

JOSEPH L. SCHOFER, Primary Examiner

E. J. SMITH, Assistant Examiner

U.S. Cl. X.R.

252—431 R, 431 P; 260—88.2 R, 94.9 C